Aug. 29, 1939.   H. H. RAULERSON   2,170,911
WIND MOTOR
Filed Aug. 15, 1938   2 Sheets-Sheet 1
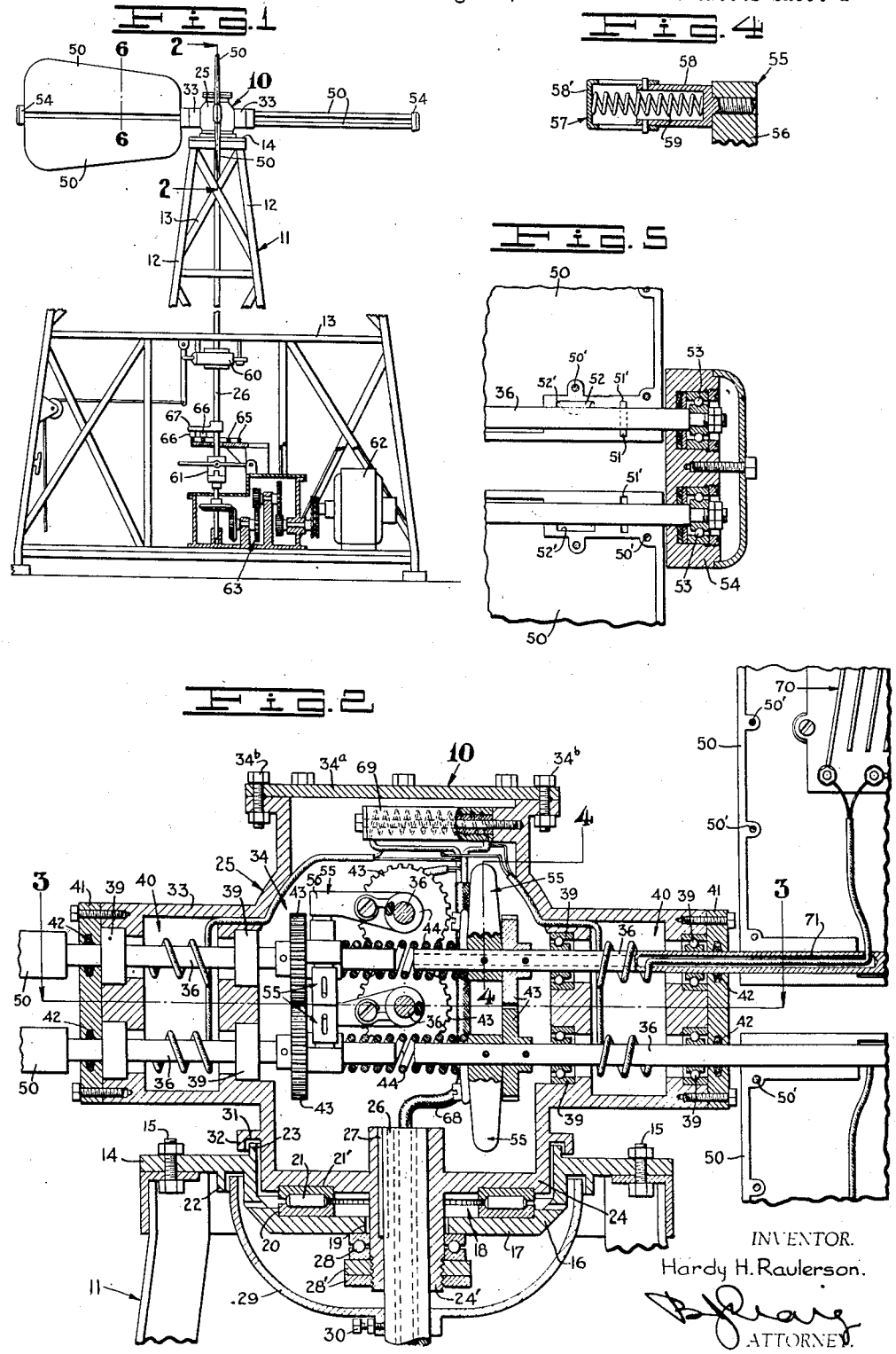
INVENTOR.
Hardy H. Raulerson.
ATTORNEY.

Aug. 29, 1939.　　H. H. RAULERSON　　2,170,911
WIND MOTOR
Filed Aug. 15, 1938　　2 Sheets-Sheet 2
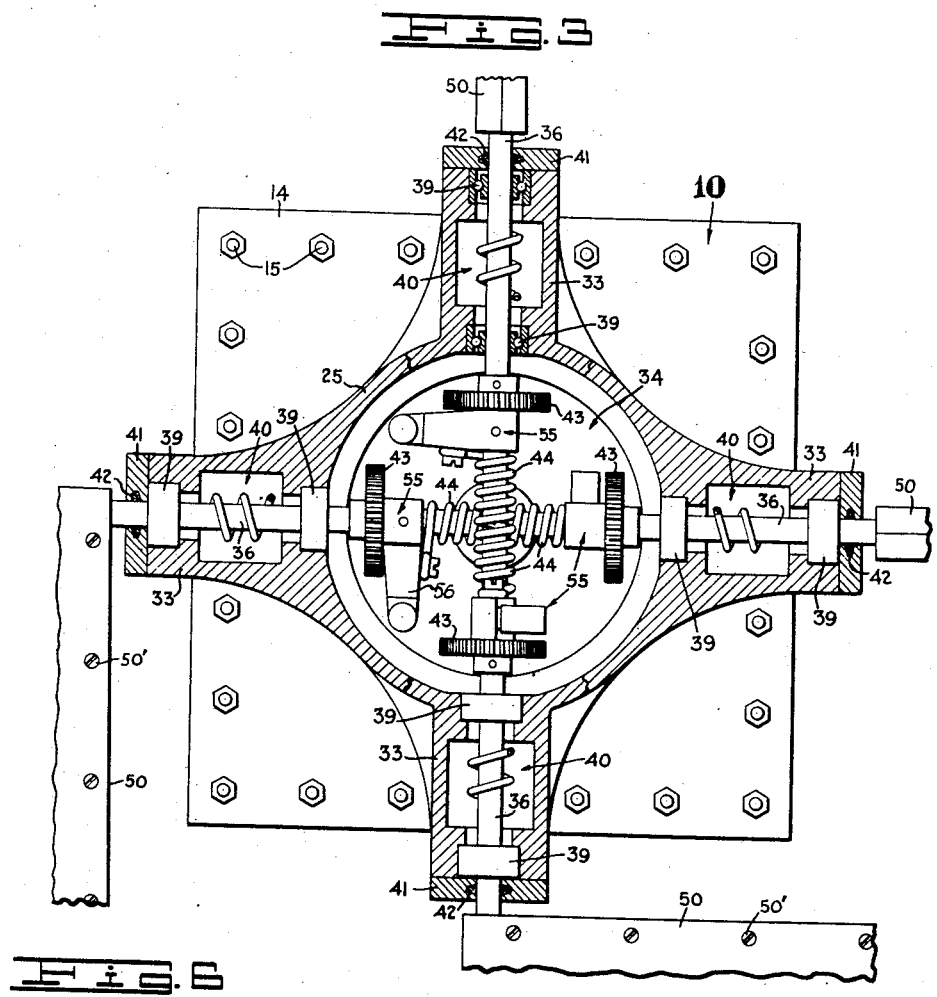
INVENTOR.
Hardy H. Raulerson.
BY
ATTORNEY.

Patented Aug. 29, 1939

2,170,911

UNITED STATES PATENT OFFICE 2,170,911

WIND MOTOR

Hardy H. Raulerson, Long Beach, Calif.

Application August 15, 1938, Serial No. 224,874

10 Claims. (Cl. 170—28)

This invention relates to wind driven rotors.

The general object of the invention is to provide an improved wind driven rotor having feathering vanes.

A more specific object of the invention is to provide a wind driven rotor having novel means to produce a feathering action of the vanes.

Another object of the invention is to provide a wind driven rotor having novel means connecting diametrically opposed vanes.

Another object of the invention is to provide a wind driven rotor having novel means to heat the vanes to prevent the formation of ice thereon.

Other objects and advantages of my invention will be apparent from the following description taken in connection with the accompanying drawings, wherein:

Fig. 1 is a fragmentary side elevation of a wind driven rotor embodying the features of my invention with portions thereof in section;

Fig. 2 is a fragmentary enlarged section taken on line 2—2 Fig. 1;

Fig. 3 is a section taken on line 3—3 Fig. 2 with portions broken away to show further details;

Fig. 4 is a fragmentary enlarged section taken on line 4—4 Fig. 2;

Fig. 5 is a vertical section through one of the outer vane supporting bearings;

Fig. 6 is an enlarged section taken on line 6—6 Fig. 1; and

Fig. 7 is a wiring diagram of the electrical heating system.

Referring to the drawings by reference characters I have shown my invention as embodied in a wind driven rotor which is indicated generally at 10. As shown in Fig. 1 the rotor 10 is mounted on a tower 11 formed in the usual manner with corner members 12 and brace members 13.

The device 10 includes a rectangular base plate 14 which is secured to the top of the tower 11 as by bolts 15. The plate 14 includes a central depending hollow hub 16 having a bottom 17 forming a chamber 18. The bottom 17 has a central aperture 19 and a shallow recess 20 engaging the lower race of an anti-friction thrust bearing 21. A skirt 22 concentric with the hub 16 depends from the lower face of the plate 14 while a raised rim 23 is provided adjacent the chamber 18.

The upper race of the bearing 21 engages a recess 21' in the lower face of a hollow hub 24 depending from a housing 25. Depending from the hub 24 is a hollow boss 24' extending through the aperture 19 in the bottom 17 and engaging a hollow vertical shaft 26 keyed thereto as at 27, an anti-friction thrust bearing 28 being disposed below the bottom 17 and on the boss 24' being secured thereon by nuts 28'. A cup-like oil retaining shell 29 is secured on the shaft 26 as by a set screw 30, the rim of the shell being disposed between the hub 16 and the skirt 22. The rim 23 on the plate 14 extends into a recess 31 in an annular flange 32 on the hub 24.

The housing 25 includes two pairs of opposed radial bosses 33 opening into a central chamber 34. An inspection plate 34a closes the chamber 34 and is secured to the housing 25 as by bolts 34b. A pair of radial shafts 36 pass through each of the bosses and are supported therein by spaced pairs of anti-friction bearings 39. It will be seen that each of the shafts 36 is coplanar with the other member of the pair and coaxial with an opposed shaft. Each of the bosses 33 includes a chamber 40 and a cover 41 including packing glands 42 therein.

Each of the shafts 36 is connected to the other member of the pair by gears 43, and is connected to the opposed shaft by a torque spring 44, so that the members of a pair rotate in opposite directions and opposed members rotate in the same direction.

A hollow streamlined vane 50 is secured to each of the shafts 36 and rotates therewith. Each of the vanes 50 is preferably formed of light die castings as shown in Fig. 6 and is made in two portions secured together as at 50'. Each vane 50 is secured to one of the shafts 36 by a pin 51 and a key 52 engaging suitable recesses 51' and 52' respectively in the vane.

The outer terminations of the shafts 36 are mounted in anti-friction bearings 53 which are mounted in a housing member 54.

Within the chamber 34 and positioned on the shafts 36 I provide stop members 55 to limit the amount of rotation of the vanes which is normally 90°. As shown each of the stop members 55 includes a radial arm 56 with a shock absorber 57 thereon. As shown in Fig. 4 each of the shock absorbers 57 comprises a pair of telescoping cylinders 58 and 58' urged apart by a spring 59. The stop members 55 on each pair of shafts 36 are so disposed that they engage each other when the corresponding pair of vanes are parallel or in the closed position and the opposed vanes are in the vertical or open position.

As disclosed, the lower end of the shaft 26 is provided with a suitable manually operated brake 60 and a clutch 61 connecting the shaft 26 to a generator 62 through suitable increased speed gearing 63. It will be obvious the device 10 may be used as a source of power to drive any other suitable machine, as for instance, a pump.

In operation it will be seen that a current of air impinging upon the vanes 50 will cause one pair of vanes to assume the closed position thus automatically opening the opposed pair so that a maximum of efficiency is secured.

Upon rotation of the rotor the vanes alternately assume the opened and closed position. To prevent damage to the machine in the event of a high wind a governing action is provided by the torque springs 44 allowing the opened pair of vanes to be opened and then forced beyond their normal fully open vertical position beyond 180° to spill the excess wind. By changing the torque springs 44 making them stiffer or more flexible the maximum speed may be altered.

To prevent ice forming on the vanes and to prevent oil lubricating the parts within the chamber 34 from congealing due to low temperature I provide an electrical heating system which may be energized by the generator 62 or some other convenient source of energy. Concentric slip rings 65 are engaged by rotatable contacts 66 on an arm 67 mounted on the shaft 26 and are provided with means to conduct a current into a conductor cable 68 which is disposed within the hollow shaft 26 as is diagrammatically shown in Fig. 7. At its upper end the conductor cable 68 communicates with a heater 69 within the chamber 34 and heaters 70 within each of the hollow vanes 50. As shown the cable is lead to the vanes by a bore 71 in each of the shafts 26.

From the above description it will be apparent that I have invented a novel wind driven rotor which is highly efficient for the intended purpose.

Having thus described my invention, I claim:

1. In a wind driven rotor, a housing, a plurality of pairs of parallel radial shafts rotably mounted in said housing, said shafts being in aligned opposed pairs, means connecting the shafts of each pair and adapted to cause the two shafts of each pair to rotate in the same directions, torque means connecting the free ends of the coaxial shafts and a vane on each shaft.

2. In a wind driven rotor, a housing including opposed radial supports, a pair of parallel radial shafts rotatably mounted in each of said supports, each shaft being coaxial with a shaft mounted in a diametrically opposed support and resilient means connecting each pair with a shaft and adapted to cause each shaft of a pair to rotate in a direction and opposite to the direction of the other shaft of the same pair.

3. In a wind driven rotor, a base plate, a housing rotatably supported on said base plate, a shaft supported by said housing, said housing including opposed radial supports, a pair of parallel radial shafts rotatably mounted in each of said supports, each shaft being coaxial with a shaft mounted in a diametrically opposed support, resilient means connecting the shafts of each pair and adapted to cause one shaft of a pair to rotate in the same direction as the other shaft of the same pair, torque means connecting the free ends of the coaxial shafts and a vane in each shaft.

4. In a wind driven rotor, a base plate, a housing rotatably supported on said base plate, a shaft supported by said housing, said housing including opposed radial bosses, a pair of radial shafts rotatably supported in each of said bosses, each shaft being coplanar with the other shaft of its pair and coaxial with the shaft supported by a diametrically opposed boss, gear means connecting the shafts of each pair, spring means connecting the opposed shafts, each of said shafts rotating in a direction opposite the direction of the other shaft of its pair, and in the same direction as the opposed shaft.

5. In a wind driven rotor, a base plate, a housing rotatably supported on said base plate, a shaft supported by said housing, said housing including opposed bosses, a pair of shafts rotatably supported in each of said bosses, each shaft being coplanar with the other shaft of its pair and coaxial with the shaft supported by a diametrically opposed boss, gear means connecting the shafts of each pair, spring means connecting the opposed shafts, each of said shafts rotating in a direction opposite the direction of the other shaft of its pair and in the same direction as its opposed shaft and a vane secured to each of said shafts.

6. In a wind driven rotor, a stationary base member and a rotatable housing member, said base member having a recess therein and having an aperture in the bottom wall of said recess, an anti-friction thrust bearing positioned in said base recess, said housing including a hub portion positioned in said base recess and engaging said anti-friction bearing, said housing hub including a reduced hollow hub portion extending through said base aperture, an anti-friction thrust bearing surrounding said reduced hub and engaging the under face of said base member, means to hold said second bearing against said base member, a vertical shaft positioned in said reduced hollow hub and rotatably secured thereto, said rotatable housing having a chamber therein and a pair of opposed bosses extending therefrom, and a pair of vertically aligned vanes on each boss.

7. In a wind driven rotor, a stationary base member and a rotatable housing member supported thereon, said rotatable housing having a chamber therein and two pairs of radial opposed boss portions extending therefrom, each of said opposed bosses having a pair of horizontally directed vertically aligned shafts, said shafts being in coaxial pairs, each vertically aligned pair of shafts being connected by intermeshing gears, each vertically aligned pair of shafts having a stop member thereon adapted to engage each other in one position of their associated shafts, and each pair of coaxial shafts being connected by a coiled spring surrounding said shafts, an end member engaging the outer ends of each pair of vertically aligned shafts, a wind vane member mounted on each of said horizontal shafts, said vanes being so arranged that when one set of vanes on vertically aligned shafts are in an open or vertical position said vanes on said opposed shafts are in a closed or horizontal position.

8. In a wind driven rotor, a stationary base member and a rotatable housing member, said base member including a recess, an anti-friction thrust bearing positioned in said base recess, said housing including a hub portion positioned in said base recess and engaging said anti-friction bearing, said hub including a reduced hollow hub portion, said base member having an aperture receiving said reduced hollow hub portion, an anti-friction thrust bearing surrounding said reduced hub and engaging the under face of said base member, a vertical shaft rotatably mounted in said reduced hollow hub, said housing having a chamber therein and two pairs of opposed radial bosses extending therefrom, each of said opposed bosses having a pair of horizontally disposed vertically aligned shafts therein, the shafts in opposed bosses being coaxial, gear means connecting each vertically aligned pair of shafts, means connecting the coaxial shafts and a wind vane member mounted on each of said horizontal shafts.

9. In a wind driven rotor, a stationary base member and a rotatable housing member, said base member including a recess therein and having an aperture in the bottom wall of said recess, an anti-friction thrust bearing positioned in said base recess, said housing including a hub portion positioned in said base recess and engaging said anti-friction bearing, said housing hub including a projecting reduced hollow hub portion extending through said aperture, an anti-friction thrust bearing surrounding said reduced hub and engaging the under face of said base member, a vertical shaft rotatably mounted in said reduced hollow hub, said housing having an open topped chamber therein and two pairs of opposed bosses extending therefrom, each of said opposed bosses having a pair of horizontally arranged, vertically aligned shafts therein, the shafts in opposed bosses being coaxial each vertically aligned pair of shafts being connected by intermeshing gears, a coiled spring surrounding and connecting said coaxial shafts, means to support the outer ends of each pair of vertically aligned shafts and a wind vane member mounted on each of said horizontal shafts.

10. In a wind driven rotor, a stationary base member and a rotatable housing member, said base member including a recess and having an aperture in the bottom wall of said recess, an anti-friction thrust bearing positioned in said base recess, said housing including a hub portion positioned in said base recess and engaging said anti-friction bearing, said housing hub including a projecting reduced hollow hub portion, an anti-friction thrust bearing surrounding said reduced hub and engaging the under face of said base member, a vertical shaft rotatably mounted in said reduced hollow hub, said housing having an open topped chamber therein and two pairs of opposed bosses extending therefrom, each of said opposed bosses having a pair of horizontally arranged vertically aligned shafts journaled therein, the shafts in opposed bosses being coaxial, each vertically aligned pair of shafts being connected by intermeshing gears, each vertically aligned pair of shafts having a stop member thereon adapted to engage each other in one position of their associated shafts, a coiled spring surrounding and connecting said coaxial shafts, an end member rotatably supporting the outer ends of each pair of vertically aligned shafts, a wind vane member mounted on and secured to each of said horizontal shafts, the construction being such that when one set of vanes on a pair of vertically aligned shafts are in an open or vertical position the vanes on the opposed shafts are in a closed or horizontal position.

HARDY H. RAULERSON.